United States Patent
Nagel

(12) 
(10) Patent No.: US 10,601,618 B1
(45) Date of Patent: Mar. 24, 2020

(54) QUADRATURE HARMONIC REJECTION MIXER

(71) Applicant: Rohde & Schwarz GmbH & Co. KG, Munich (DE)

(72) Inventor: Joerg Nagel, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 0 days.

(21) Appl. No.: 16/233,934

(22) Filed: Dec. 27, 2018

(51) Int. Cl.
*H04B 1/04* (2006.01)
*H04B 15/00* (2006.01)
*H04L 27/12* (2006.01)

(52) U.S. Cl.
CPC ............ *H04L 27/12* (2013.01); *H04B 15/00* (2013.01)

(58) Field of Classification Search
CPC ........ H04B 1/04; H04B 15/00; H04B 1/0475; H04L 27/00; H04L 27/20; H04L 27/32
See application file for complete search history.

(56) References Cited

U.S. PATENT DOCUMENTS

| | | | | |
|---|---|---|---|---|
| 7,130,604 B1* | 10/2006 | Wong | .................. | H03D 7/12 455/302 |
| 8,165,538 B2* | 4/2012 | Pullela | .................. | H03D 7/1441 455/114.1 |
| 8,406,707 B2* | 3/2013 | Pullela | .................. | H03D 7/1441 455/114.1 |
| 8,422,975 B2* | 4/2013 | Behera | .................. | H03D 7/18 455/114.1 |
| 8,704,582 B2* | 4/2014 | Goel | .................. | H03B 1/04 327/356 |
| 2006/0205370 A1* | 9/2006 | Hayashi | .................. | H03D 7/1441 455/209 |
| 2007/0242775 A1* | 10/2007 | Cheng | .................. | H03B 27/00 375/308 |
| 2019/0207565 A1* | 7/2019 | de Vreede | .................. | H03F 1/3241 |

OTHER PUBLICATIONS

Moseley, N.A., et al.,"A Two-Stage Approach to Harmonic Rejection Mixing Using Blind Interference Cancellation," IEEE Transactions on Circuits and Systems-II: Express Briefs 55(10):966-970, Oct. 2008.

(Continued)

*Primary Examiner* — Blane J Jackson
(74) *Attorney, Agent, or Firm* — Christensen O'Connor Johnson Kindness PLLC

(57) ABSTRACT

An apparatus for modulating a signal is described. The apparatus comprises a first modulation unit, a second modulation unit and at least one local oscillator providing a local oscillator signal with an initial frequency. Each modulation unit has a main modulation member and an auxiliary modulation member. The local oscillator is connected with the first and second modulation units via a first local oscillator sub path and a first local oscillator path as well as a second local oscillator sub path and a second local oscillator path respectively. The local oscillator sub paths process downconverted local oscillator signals. The main modulation member of each modulation unit is connected with one of the local oscillator sub paths. The auxiliary modulation member of each modulation unit is connected with one of the local oscillator sub paths and one of the local oscillator paths. Further, a method for modulating a signal is described.

16 Claims, 3 Drawing Sheets

(56) References Cited

OTHER PUBLICATIONS

Weldon, J.A., "High Performance CMOS Transmitters for Wireless Communications," dissertation submitted in partial satisfaction of the requirements for the degree of Doctor of Philosophy, University of California, Berkeley, 2005, 245 pages.

Kibaroglu, K., and Rebeiz, G.M., "A 0.05-6 GHz Voltage-Mode Harmonic Rejection Mixer with up to 30 dBm In-Band IIP3 and 35 dBc HRR in 32 nm SOI CMOS," IEEE Radio Frequency Integrated Circuits Symposium, pp. 304-307, Jun. 2017.

* cited by examiner

Inphase (I)  a)

Quadrature (Q)  b)

Inphase (I)  c)

Quadrature (Q)  d)

e)

f)

g)

QUADRATURE HARMONIC REJECTION MIXER

FIELD OF THE DISCLOSURE

Embodiments of the present disclosure generally relate to an apparatus for modulating a signal, for instance a radio frequency signal. Further, embodiments of the present disclosure generally relate to a method for modulating a signal, for instance a radio frequency signal.

BACKGROUND

In the state of the art, high frequency modulators, also called radio frequency modulators, are known that are based on in-phase (I) and quadrature (Q) components (I/Q data), namely I/Q data of a baseband signal. In fact, these modulators are inter alia used in signal generators or communication systems for generating a signal wherein these modulators are used to generate wanted signal portions. Typically, this is done by multiplying a modulated baseband signal represented by its I/Q components with a local oscillator signal having harmonics. Thus, the outputted signal also has harmonics assigned to the frequency of the outputted signal, also called modulation output frequency. The harmonics arise from the approximately rectangular signal form of the local oscillator signal which is advantageous when multiplying the local oscillator signal with the baseband signal. Typically, the multiplication of the baseband signal with the rectangular local oscillator signal yields components like $$B(t)*LO(t) =$$
$$B(t)*\left[\sin(wLO(t)) + \frac{1}{3}*\sin(3*wLO(t)) + \frac{1}{5}*\sin(5*wLO(t)) \ldots\right]$$

In many applications, only the component B(t)*sin(wLO(t)) of the several components mentioned above is of interest so that the other components relate to disturbances which have to be filtered. Typically, analog filters are used for suppressing the disturbances, namely the unwanted components resulting from multiplication of the baseband signal with the rectangular local oscillator signal.

However, complex filters are necessary in applications that use a variable modulation output frequency since the respective filters also have to be variable in order to ensure that the filters can be adapted with respect to the modulation output frequency.

Accordingly, there is a need for a less complex and more cost-efficient possibility to suppress unwanted signal portions, in particular harmonics.

SUMMARY

Embodiments of the present disclosure provide an apparatus for modulating a frequency signal, for instance a radio frequency signal. The apparatus comprises at least one local oscillator that provides a local oscillator signal with an initial frequency. The apparatus also comprises at least a first modulation unit as well as a second modulation unit. Each modulation unit has at least one main modulation member and at least one auxiliary modulation member. The local oscillator is connected with the first modulation unit via a first local oscillator sub path and a first local oscillator path. The local oscillator is also connected with the second modulation unit via a second local oscillator sub path and a second local oscillator path. The local oscillator sub paths process down-converted local oscillator signals with a down-converted frequency with respect to the initial frequency. The main modulation member of each modulation unit is connected with at least one of the local oscillator sub paths. The auxiliary modulation member of each modulation unit is connected with at least one of the local oscillator sub paths and at least one of the local oscillator paths.

Further, embodiments of the present disclosure provide a method for modulating a signal, with the following steps:

Inputting a local oscillator signal with an initial frequency,

Splitting the local oscillator signal to obtain a first down-converted local oscillator signal processed in a first local oscillator sub path and a second down-converted local oscillator signal processed in a second local oscillator sub path, the local oscillator signals having a down-converted frequency compared to the initial frequency, Inputting the first down-converted local oscillator signal into a main modulation member of a first modulation unit, Inputting the second down-converted local oscillator signal into a main modulation member of a second modulation unit, and Forwarding the local oscillator signal and at least one of the first and second down-converted local oscillator signals to an auxiliary modulation member of each modulation unit.

The apparatus as well as the method ensure that harmonics can be suppressed in the apparatus itself and during the modulating itself respectively. Accordingly, the complexity of an additional filter can be reduced that is located downstream of the apparatus in a system comprising the apparatus. In some embodiments, the filter may be eliminated completely. For instance, degradations of frequency response and/or phase response are effectively avoided by the apparatus itself or rather during the modulating. In addition, broadband output signals may be generated by the apparatus, namely common modulated signals of the apparatus, since disturbing overlaps of wanted and disturbing signal portions are prevented.

In some embodiments, the apparatus is configured to already make an impact on the generation of harmonics, for example avoiding the generation of harmonics. In other words, this impact may take place during the modulating. Hence, disturbing multiplication products, namely the unwanted signal portions, can be suppressed during the modulation.

Generally, the local oscillator signal with the initial frequency is split in at least two down-converted local oscillator signals, also called split local oscillator signals, which are derived from a single local oscillator signal being a single source signal. The respective split signals or rather the down-converted local oscillator signals are combined by the apparatus in a specific manner so that harmonics are mostly avoided or at least minimized in a substantial manner. Moreover, the local oscillator signal may have a specific frequency or signal form improving the suppression of the harmonics.

Thus, it is ensured that a system comprising the apparatus may be established in a less complex manner since filters can be reduced in their complexity. Furthermore, filters for filtering unwanted signal portions may be avoided completely.

According to an aspect, the first modulation unit or modulator has a first output via which a first modulated signal is outputted. The first modulation unit may be assigned to the in-phase component (I) or rather the quadrature (Q) component of the I/Q data, namely the baseband signal.

Further, the second modulation unit or modulator has a second output via which a second modulated signal is outputted. The second modulation unit may be generally configured in a substantially similar manner as the first modulation unit. Both modulation units distinguish from each other in that they receive different components of the baseband signal, namely the in-phase (I) component or the quadrature (Q) component of the baseband signal.

The respective modulation unit receives the local oscillator signal, one of the down-converted local oscillator signals as well as a respective component of the I/Q data, namely the respective component concerning the baseband signal. The respective modulation unit processes these input signals appropriately such that the respective modulated signal is generated and outputted.

Accordingly, a first modulated signal is outputted by the first modulation unit and a second modulated signal is outputted by the second modulation unit.

In some embodiments, the first output and the second output merge into a common output such that the first modulated signal and the second modulated signal are added to a common modulated signal. Hence, the first modulated signal and the second modulated signal are added to a common modulated signal. The common modulated signal corresponds to the output signal of the apparatus. Stated differently, the first modulated signal generated by the first modulation unit and the second modulated signal generated by the second modulation unit are added to form the common modulated signal.

Another aspect provides that at least one of the first modulated signal and the second modulated signal is at least one of weighted, amplified and attenuated such that the first modulated signal and the second modulated signal have different amplitudes. For instance, cancellation of the disturbing products can be achieved by obtaining a certain ratio of the amplitudes of the modulated signals added with each other to obtain the common modulated signal, namely the output signal.

Another aspect provides that the auxiliary modulation member of each modulation unit is connected with a respective inversed local oscillator sub path such that the down-converted local oscillator signal is inverted. Accordingly, the auxiliary modulation member of the first modulation unit in some embodiments is connected with the second local oscillator sub path. Further, the auxiliary modulation member of the second modulation unit is connected in some embodiments with the first local oscillator sub path. Thus, in these embodiments, the auxiliary modulation member of each modulation unit is connected with one of both local oscillator sub paths and the main modulation member of each modulation unit is connected with the other of both local oscillator sub paths.

In other words, the down-converted local oscillator signal is inverted for generating the input of the respective auxiliary modulation member of the corresponding modulation unit.

According to another aspect, an exclusive OR (XOR) gate is assigned to the auxiliary modulation member of each modulation unit. Accordingly, the down-converted local oscillator signal processed via the respective local oscillator sub path and the respective local oscillator signal both pass an exclusive OR gate in some embodiments prior to being inputted into the respective auxiliary modulation member. The exclusive OR (XOR) gate is a digital logic gate that gives a true (1 or HIGH) output, also called gated signal, when the number of true inputs is odd. Hence, the down-converted local oscillator signal as well as the local oscillator signal processed by the auxiliary modulation member are passed by the exclusive OR gate previously so that an output signal is forwarded to the auxiliary modulation member of each modulation unit. The output signal is generated by the exclusive OR (XOR) gate depending on the signals inputted, namely the down-converted local oscillator signal and the local oscillator signal.

Another aspect provides that, in each modulation unit, an output signal of the auxiliary modulation member and an output signal of the main modulation member are added generating the respective modulated signal. The output signals of the modulation members ensure that the effective modulated signal generated by the respective modulation unit correspond to multi-step signals. By adding the respective modulated signals, unwanted signal portions such as harmonics are suppressed effectively.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
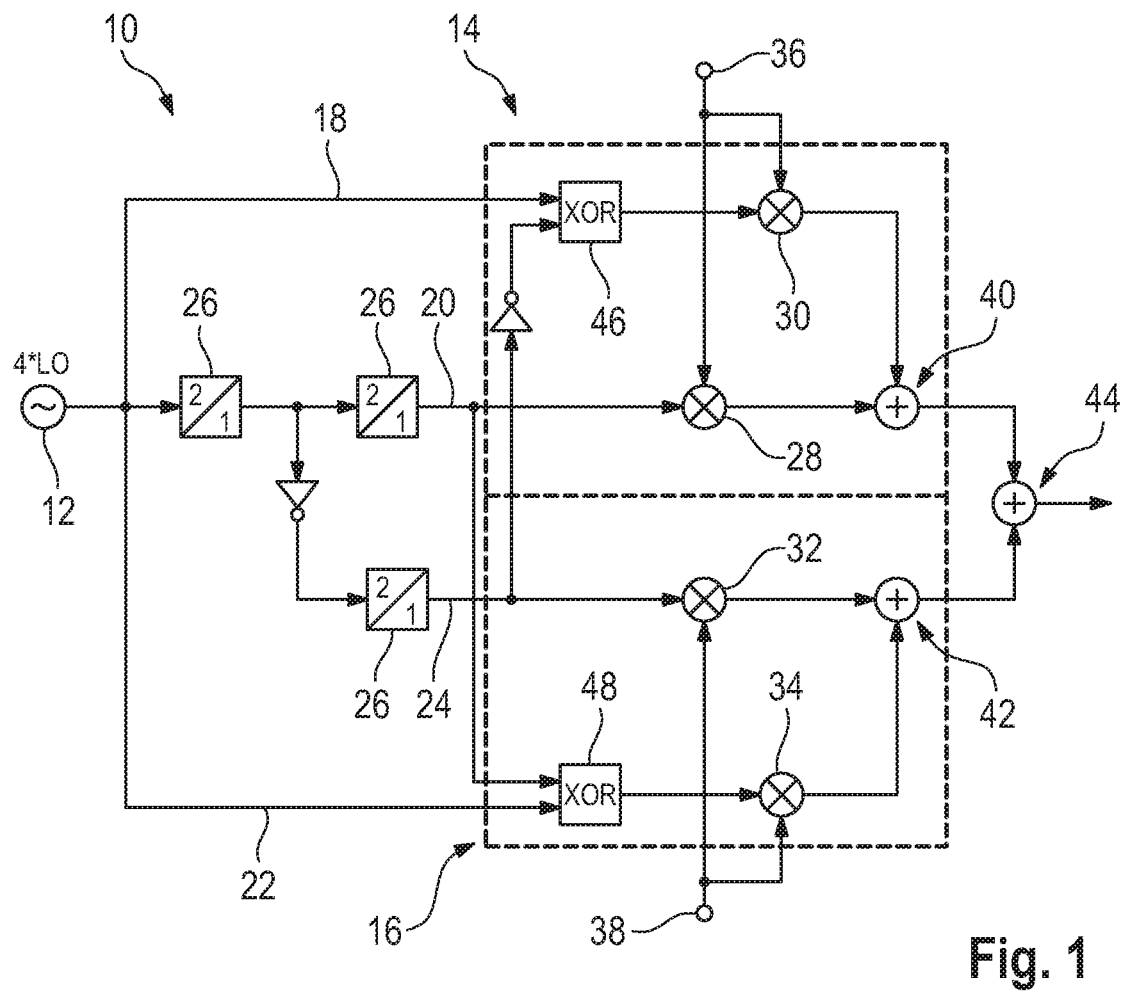
FIG. 1 schematically shows a representative example of an apparatus for modulating a signal according to the present disclosure, FIG. 2 schematically shows a flow-chart illustrating a representative method for modulating a signal according to the present disclosure.

FIG. 1 depicts an example of an apparatus 10 for modulating a signal. The apparatus 10 can also be called a radio frequency modulator or rather high frequency modulator. The apparatus 10 comprises at least one local oscillator 12 that provides a local oscillator signal with an initial frequency. In the shown embodiment, the initial frequency is labeled with 4 LO since the frequency is four times higher than the frequency of the mixing signal LO. The apparatus 10 further comprises a first modulation unit 14 as well as a second modulation unit 16.

As shown in the embodiment of FIG. 1, the first modulation unit 14 is connected with the local oscillator 12 via a first local oscillator path 18 and a first local oscillator sub path 20 whereas the second modulation unit 16 is connected with the local oscillator 12 via a second local oscillator path 22 as well as a second local oscillator sub path 24. Both local oscillator sub paths 20, 24 are connected with the local oscillator 12 via splitters 26. In total, three splitters 26 are provided wherein each local oscillator sub path 20, 24 is connected with the local oscillator 12 by two splitters 26 arranged in series. Accordingly, a first splitter 26, namely the one located downstream of the local oscillator 12, is a common splitter 26 that is assigned to both local oscillator sub paths 20, 24.

The first modulation unit 14 in some embodiments comprises a first main modulation member 28 as well as a first auxiliary modulation member 30. The second modulation unit 16 in some embodiments comprises a second main modulation member 32 as well as a second auxiliary modulation member 34. In addition, the first modulation unit 14 is assigned to a first input 36 via which a first component of a baseband is forwarded to the first modulation unit 14, for instance the in-phase (I) component. The second modulation unit 16 also comprises a second input 38 via which a second baseband component is forwarded to the second modulation unit 16, for instance the quadrature (Q) component.

The first modulation unit 14 also has a first output 40 whereas the second modulation unit 16 has a second output 42. Both outputs 40, 42 of the respective modulation units 14, 16 merge into a common output 44 of the apparatus 10 via which the modulated signal is outputted.

In general, the respective main modulation member 28, 32 of the corresponding modulation unit 14, 16 is assigned to the respective local oscillator sub path 24, as well as the respective input 36, 38. In addition, the respective auxiliary modulation member 30, 34 of the corresponding modulation unit 14, 16 is assigned to the respective input 36, 38 of the modulation unit 14, 16 as well as the inversed local oscillator path 20, 24 as well as the respective local oscillator path 18, 22. This means that the first auxiliary modulation member 30 of the first modulation unit 14 is assigned to the first local oscillator path 18 as well as the second local oscillator sub path 24 in addition to the first input 36. In a similar manner, the second auxiliary modulation member 34 is assigned to the second local oscillator path 22 as well as the first local oscillator sub path 20 in addition to the second input 38.

The first modulation unit 14 in some embodiments has a first exclusive OR gate 46 that is located prior to the first auxiliary modulation member 30 wherein the first exclusive OR gate 46 is connected at its input side with the first local oscillator path 18 and the second local oscillator sub path 24. The output side of the exclusive OR gate 46 is connected with the auxiliary modulation member 30.

Additionally or alternatively, the second modulation unit 16 also has a second exclusive OR gate 48 that is connected at its input side with the second local oscillator path 22 as well as the first local oscillator sub path 20. The output side of the second exclusive OR gate 48 is connected with the second auxiliary modulation member 34.

Accordingly, the auxiliary modulation member 30, 34 of each modulation unit 14, 16 is connected with a respective inversed local oscillator sub path 20, 24 such that the down-converted local oscillator signal is inverted. In other words, the down-converted local oscillator signal is inverted for generating the input of the respective auxiliary modulation member 30, 34 of the corresponding modulation unit 14, 16.

Figure 2:
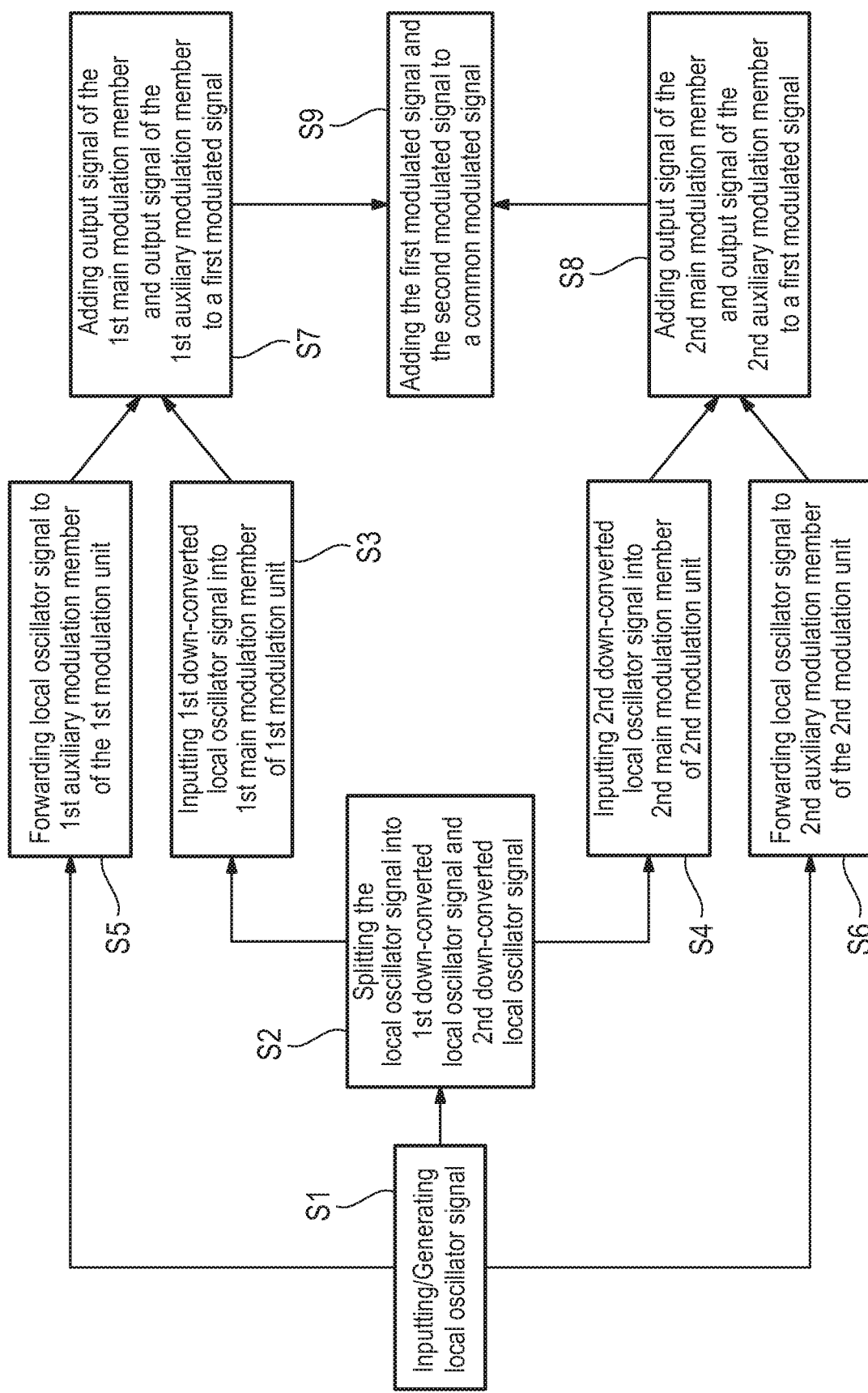

In general, the first modulation unit 14 is assigned to the in-phase (I) component whereas the second modulation unit 16 is assigned to the quadrature (Q) component. Hereinafter, the functionality of the apparatus 10 shown in FIG. 1 is described with reference to FIG. 2 illustrating a flow-chart and FIGS. 3a-3g comprising several overviews of the different signals processed by the apparatus 10.

In a first step S1, the local oscillator signal with an initial frequency 4 LO is inputted/generated via the local oscillator 12.

Figure 3:
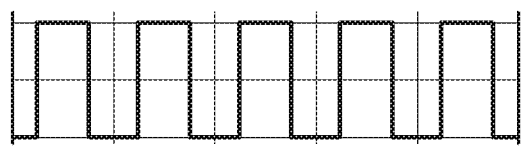
FIGS. 3a-3g show an overview of diagrams illustrating signals processed by the apparatus shown in FIG. 1.
Figure 3:
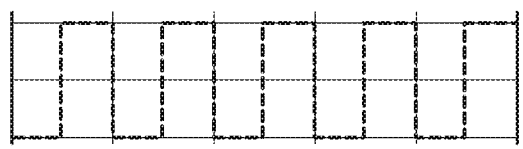
Figure 3:
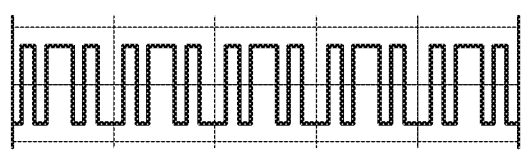
Figure 3:
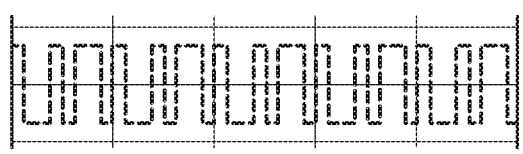
Figure 3:
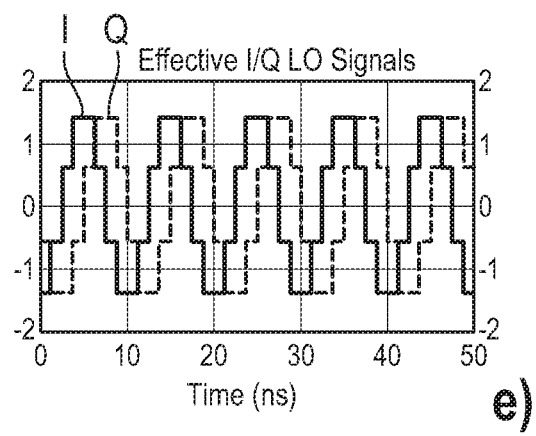
Figure 3:
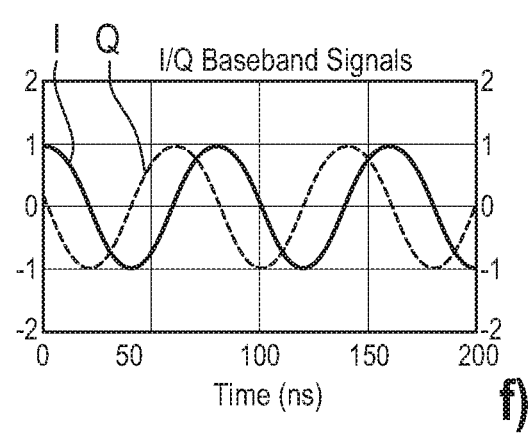
Figure 3:
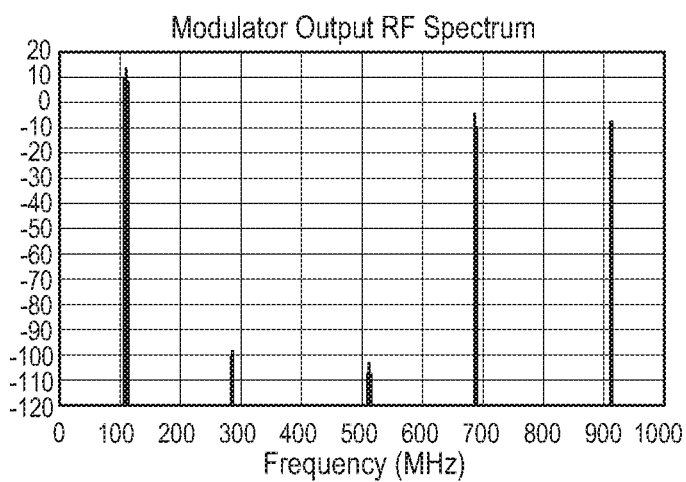

In a second step S2, the local oscillator signal is split wherein a first down converted local oscillator signal is obtained that is processed in the first local oscillator sub path 20 wherein the first down-converted local oscillator signal is shown in FIG. 3a. The first down-converted local oscillator signal corresponds to the in-phase (I) component of the down-converted local oscillator signal having a quarter of the initial frequency after passing two splitters 26. Hence, it can be labelled as LO_I.

Further, a second down-converted local oscillator signal is obtained that is processed in the second local oscillator sub path 24 wherein the second down-converted local oscillator signal is shown in FIG. 3b. The second down-converted local oscillator signal corresponds to the quadrature (Q) component of the down-converted local oscillator signal having a quarter of the initial frequency after passing two splitters 26. Hence, it can be labelled as LO_Q.

For instance, the local oscillator signals each have a down-converted frequency compared to the initial frequency of the local oscillator signal. Since the respective down-converted local oscillator signals are split twice each, the down-converted frequency is a quarter of the initial frequency. In other words, the frequency of the down-converted local oscillator signal is a LO whereas the initial frequency is 4LO.

In a third step S3, the first down-converted local oscillator signal is inputted into the first main modulation member 28 of the first modulation unit 14. Then, the first down-converted local oscillator signal is multiplied with the baseband component received via the first input 36, namely the in-phase (I) component.

In a fourth step S4, the second down-converted local oscillator signal is inputted into the second main modulation member 32 of the second modulation unit 16. Then, the second down-converted local oscillator signal is multiplied with the baseband component received via the second input 38, namely the quadrature (Q) component.

In a fifth step S5, the local oscillator signal is forwarded to the first auxiliary modulation member 30 of the first modulation unit 14 as well as the second down-converted local oscillator signal processed in the second local oscillator sub path 24, namely the one assigned to the quadrature (Q) component. These signals are inputted at the first exclusive OR gate 46 that is located upstream of the first auxiliary modulation member 30. The output of the first exclusive OR gate 46 is shown in FIG. 3c.

In the first auxiliary modulation member 30, the output of the first exclusive OR gate 46 is multiplied with the component of the baseband signal received via the first input 36, namely the in-phase (I) component.

In a sixth step S6, the local oscillator signal is forwarded via the second local oscillator path 22 to the second auxiliary modulation member 34 of the second modulation unit 16 as well as the first down-converted local oscillator signal processed by the first local oscillator sub path 20, namely the one assigned to the in-phase (I) component. These signals are inputted at the second exclusive OR gate 48 that is located upstream of the second auxiliary modulation member 34. The output of the second exclusive OR gate 48 is shown in FIG. 3d.

In the second auxiliary modulation member 34, the output of the second exclusive OR gate 48 is multiplied with the component of the baseband signal received via the second input 38, namely the quadrature (Q) component.

Accordingly, the respective down-converted local oscillator signal is inverted for generating the input of the corresponding auxiliary modulation member 30, 34 of the corresponding modulation unit 14, 16.

In other words, the in-phase (I) component of the down-converted local oscillator signal is forwarded to the second auxiliary modulation member 34 processing the quadrature (Q) component of the baseband signal. Further, the quadrature (Q) component of the down-converted local oscillator signal is forwarded to the first auxiliary modulation member 30 processing the in-phase (I) component of the baseband signal.

As shown in FIGS. 3c and 3d, the respective output signals of the exclusive OR gates 46, 48 also correspond to rectangular signals similar to the local oscillator signal or rather the down-converted local oscillator signal(s).

In a seventh step S7, the output signal of the first main modulation member 28 as well as the output signal of the first auxiliary modulation member 30 are added so that a first modulated signal is outputted at the first output 40.

In an eighth step S8, the output signal of the second main modulation member 32 as well as the output signal of the second auxiliary modulation member 34 are added so that a second modulated signal is outputted at the second output 42.

The in-phase (I) and quadrature (Q) components of the effective local oscillator signal and the baseband signal are shown in FIGS. 3e and 3f These FIGURES reveal that the effective local oscillator signal has a very specific form, namely a multi-step form.

In a ninth step S9, the first modulated signal as well as the second modulated signal are added to a common modulated signal that is outputted via the common output 44 of the apparatus 10.

The (radio frequency) signal outputted, namely the output signal of the apparatus 10, is shown FIG. 3g.

The shown diagrams represent an I/Q modulation with a local oscillator frequency of 100 MHz wherein the baseband signal corresponds to a single tone having a frequency of 12.5 MHz.

During the adding step(s), the first modulated signal and/or the second modulated signal are/is at least one of weighted, amplified and attenuated such that the first modulated signal and the second modulated signal have different amplitudes.

For instance, the control current(s) of the hardware components establishing the digital logic used for modulating purposes may be scaled or rather adapted appropriately in order to provide the weighting, amplifying and/or attenuation in the desired manner.

By adding the respective signals, for example the respective weighted, amplified and/or attenuated ones, unwanted signal portions such as harmonics are suppressed effectively. In some embodiments, the third and fifth harmonics can be cancelled in a substantially perfect manner.

Accordingly, an apparatus 10 as well as a method are provided that ensure to suppress unwanted signal portions, for example harmonics, in a less complex and more cost-efficient manner since no additional filters are required. In some embodiments, the unwanted signal portions, for example harmonics, are suppressed during the modulation itself, namely in the apparatus 10.

The apparatus 10 may be called IQ modulator since the modulation is based on I/Q data.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property of privilege is claimed are defined as follows:

1. An apparatus for modulating a signal, comprising:
at least one local oscillator providing a local oscillator signal with an initial frequency and at least a first modulation unit as well as at least a second modulation unit, each modulation unit having at least one main modulation member and at least one auxiliary modulation member, the local oscillator being connected with the first modulation unit via a first local oscillator sub path and a first local oscillator path, the local oscillator being connected with the second modulation unit via a second local oscillator sub path and a second local oscillator path, the local oscillator sub paths processing down-converted local oscillator signals with a down-converted frequency with respect to the initial frequency, the main modulation member of each modulation unit being connected with at least one of the local oscillator sub paths, the auxiliary modulation member of each modulation unit being connected with at least one of the local oscillator sub paths and at least one of the local oscillator paths.

2. The apparatus according to claim 1, wherein the first modulation unit has a first output via which a first modulated signal is outputted.

3. The apparatus according to claim 1, wherein the second modulation unit has a second output via which a second modulated signal is outputted.

4. The apparatus according to claim 2, wherein the first output and the second output merge into a common output such that the first modulated signal and the second modulated signal are added to a common modulated signal.

5. The apparatus according to claim 3, wherein the first output and the second output merge into a common output such that the first modulated signal and the second modulated signal are added to a common modulated signal.

6. The apparatus according to claim 2, wherein at least one of the first modulated signal and the second modulated signal is at least one of weighted, amplified and attenuated such that the first modulated signal and the second modulated signal have different amplitudes.

7. The apparatus according to claim 3, wherein at least one of the first modulated signal and the second modulated signal is at least one of weighted, amplified and attenuated such that the first modulated signal and the second modulated signal have different amplitudes.

8. The apparatus according to claim 1, wherein the auxiliary modulation member of each modulation unit is connected with a respective inversed local oscillator sub path such that the down-converted local oscillator signal is inverted with respect to a baseband component used by the respective modulation unit.

9. The apparatus according to claim 1, wherein an exclusive OR gate is assigned to the auxiliary modulation member of each modulation unit.

10. A method for modulating a signal, with the following steps:
   inputting a local oscillator signal with an initial frequency;
   splitting the local oscillator signal to obtain a first down-converted local oscillator signal processed in a first local oscillator sub path and a second down-converted local oscillator signal processed in a second local oscillator sub path, the local oscillator signals having a down-converted frequency compared to the initial frequency;
   inputting the first down-converted local oscillator signal into a main modulation member of a first modulation unit;
   inputting the second down-converted local oscillator signal into a main modulation member of a second modulation unit; and
   forwarding the local oscillator signal and at least one of the first and second down-converted local oscillator signals to an auxiliary modulation member of each modulation unit.

11. The method according to claim 10, wherein a first modulated signal is outputted by the first modulation unit and a second modulated signal is outputted by the second modulation unit.

12. The method according to claim 11, wherein the first modulated signal and the second modulated signal are added to a common modulated signal.

13. The method according to claim 11, wherein at least one of the first modulated signal and the second modulated signal is at least one of weighted, amplified and attenuated such that the first modulated signal and the second modulated signal have different amplitudes.

14. The method according to claim 10, wherein the down-converted local oscillator signal processed via the respective local oscillator sub path is inverted prior to being inputted into the respective auxiliary modulation member.

15. The method according to claim 10, wherein the down-converted local oscillator signal processed via the respective local oscillator sub path and the respective local oscillator signal both pass an exclusive OR gate prior to being inputted into the respective auxiliary modulation member.

16. The method according to claim 10, wherein, in each modulation unit, an output signal of the auxiliary modulation member and an output signal of the main modulation member are added generating the respective modulated signal.

* * * * *